(12) United States Patent
Kumar et al.

(10) Patent No.: US 11,570,073 B1
(45) Date of Patent: Jan. 31, 2023

(54) SERVICE STATUS NOTIFICATION

(71) Applicant: Juniper Networks, Inc., Sunnyvale, CA (US)

(72) Inventors: Pankaj Kumar, Bangalore (IN); Prabhu Raj V. K., Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/691,083

(22) Filed: Nov. 21, 2019

(51) Int. Cl.
*H04L 43/0805* (2022.01)
*H04L 12/46* (2006.01)
*H04L 9/40* (2022.01)
*H04L 69/324* (2022.01)

(52) U.S. Cl.
CPC ...... *H04L 43/0805* (2013.01); *H04L 12/4675* (2013.01); *H04L 63/0272* (2013.01); *H04L 69/324* (2013.01)

(58) Field of Classification Search
CPC ............. H04L 43/0805; H04L 12/4675; H04L 63/0272; H04L 69/324
See application file for complete search history.

(56) References Cited

U.S. PATENT DOCUMENTS

| | | | | |
|---|---|---|---|---|
| 7,843,843 B1* | 11/2010 | Papp, III | ............ | H04L 41/5025 370/395.42 |
| 2006/0075279 A1* | 4/2006 | Cameros | ................ | H04L 67/02 714/4.1 |
| 2006/0126496 A1* | 6/2006 | Filsfils | ................... | H04L 45/02 370/216 |
| 2010/0061230 A1* | 3/2010 | Xiong | ................ | H04L 43/0817 370/225 |
| 2010/0115048 A1* | 5/2010 | Scahill | .................. | H04L 67/325 709/213 |
| 2012/0087232 A1* | 4/2012 | Hanabe | ............... | G06F 11/2002 370/217 |
| 2012/0163357 A1* | 6/2012 | Won | ...................... | H04L 1/1887 370/338 |
| 2013/0268590 A1* | 10/2013 | Mahadevan | ............ | H04L 67/16 709/204 |
| 2014/0003232 A1* | 1/2014 | Guichard | ............ | H04L 67/1029 370/230 |
| 2014/0219081 A1* | 8/2014 | Natarajan | ............... | H04L 45/28 370/228 |
| 2014/0301180 A1* | 10/2014 | Sivapuram | .............. | H04L 69/40 370/216 |

(Continued)

*Primary Examiner* — Jefferey F Harold
*Assistant Examiner* — Franklin S Andramuno
(74) *Attorney, Agent, or Firm* — Harrity & Harrity, LLP

(57) ABSTRACT

A provider edge (PE) device may receive traffic associated with one or more services, wherein the traffic includes a plurality of packets, and may determine, based on the plurality of packets, one or more packets respectively associated with each service of the one or more services. The PE device may determine, based on the one or more packets respectively associated with each service of the one or more services, a respective status of each of the one or more services. The PE device may generate type-length-value (TLV) data that indicates the respective status of each of the one or more services and may cause the TLV data to be added to a link layer discovery protocol (LLDP) packet. The PE device may send the LLDP packet that includes the added TLV data to a customer edge (CE) device.

20 Claims, 11 Drawing Sheets

(56) References Cited

U.S. PATENT DOCUMENTS

| | | | | |
|---|---|---|---|---|
| 2015/0271031 A1* | 9/2015 | Beevers | ............. | H04L 43/08 |
| | | | | 709/224 |
| 2018/0089011 A1* | 3/2018 | Basiri | ............. | G06F 9/5077 |
| 2020/0213182 A1* | 7/2020 | Hugar | ............. | H04L 45/026 |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Type = (NEW_SERVICE_STATUS-TYP|               |   Length      |
|     (say unused 0xA)         |               |               |
+-+-+-+-+-+-+-+-+-+-+-+-+-+-+-+-+-+-+-+-+-+-+-+-+-+-+-+-+-+-+-+-+
|                   Service-Status-Information                  |
+-+-+-+-+-+-+-+-+-+-+-+-+-+-+-+-+-+-+-+-+-+-+-+-+-+-+-+-+-+-+-+-+
|            Service-ID-x                       |   Status      |
+-+-+-+-+-+-+-+-+-+-+-+-+-+-+-+-+-+-+-+-+-+-+-+-+-+-+-+-+-+-+-+-+
|            Service-ID-y                       |   Status      |
+-+-+-+-+-+-+-+-+-+-+-+-+-+-+-+-+-+-+-+-+-+-+-+-+-+-+-+-+-+-+-+-+
|            Service-ID-w                       |   Status      |
+-+-+-+-+-+-+-+-+-+-+-+-+-+-+-+-+-+-+-+-+-+-+-+-+-+-+-+-+-+-+-+-+
                         .*
+-+-+-+-+-+-+-+-+-+-+-+-+-+-+-+-+-+-+-+-+-+-+-+-+-+-+-+-+-+-+-+-+
|            Service-ID-N                       |   Status      |
+-+-+-+-+-+-+-+-+-+-+-+-+-+-+-+-+-+-+-+-+-+-+-+-+-+-+-+-+-+-+-+-+

Length = <Length of Total-Service-Status to follow - (N-service-status*4B)>
Each Service-Status-Value =
    MSB 24b - [Service-ID or Vlan-ID]
    LSB 8b  - [Status]
              (0 - reserved, 1- UP, 2-ADMIN_DOWN, 3-DOWN)
```

FIG. 2A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Type = 127(CUSTOM-TLV-TYPE)    |            Length             |
+-+-+-+-+-+-+-+-+-+-+-+-+-+-+-+-+-+-+-+-+-+-+-+-+-+-+-+-+-+-+-+-+
|                         Custom-TLV-1                          |
+-+-+-+-+-+-+-+-+-+-+-+-+-+-+-+-+-+-+-+-+-+-+-+-+-+-+-+-+-+-+-+-+
|custom-tlv-type|               |                               |
|(Operator Specific-Type for|   |   Length(N-service-status*4B) |
|Service-Status |               |                               |
+-+-+-+-+-+-+-+-+-+-+-+-+-+-+-+-+-+-+-+-+-+-+-+-+-+-+-+-+-+-+-+-+
|                   Service-Status-Information                  |
+-+-+-+-+-+-+-+-+-+-+-+-+-+-+-+-+-+-+-+-+-+-+-+-+-+-+-+-+-+-+-+-+
|             Service-ID-X                      |    Status     |
|      x                                        |    Status     |
|             Service-ID-N                      |    Status     |
+-+-+-+-+-+-+-+-+-+-+-+-+-+-+-+-+-+-+-+-+-+-+-+-+-+-+-+-+-+-+-+-+

Length = <Length of Total-Service-Status to follow - (N-service-status*4B)>
Each Service-Status-Value =
   MSB 24b - Service-ID or Vlan-ID
   LSB  8b - Status
             (0 - reserved,1- UP, 2-ADMIN_DOWN, 3-DOWN)
```

FIG. 2B

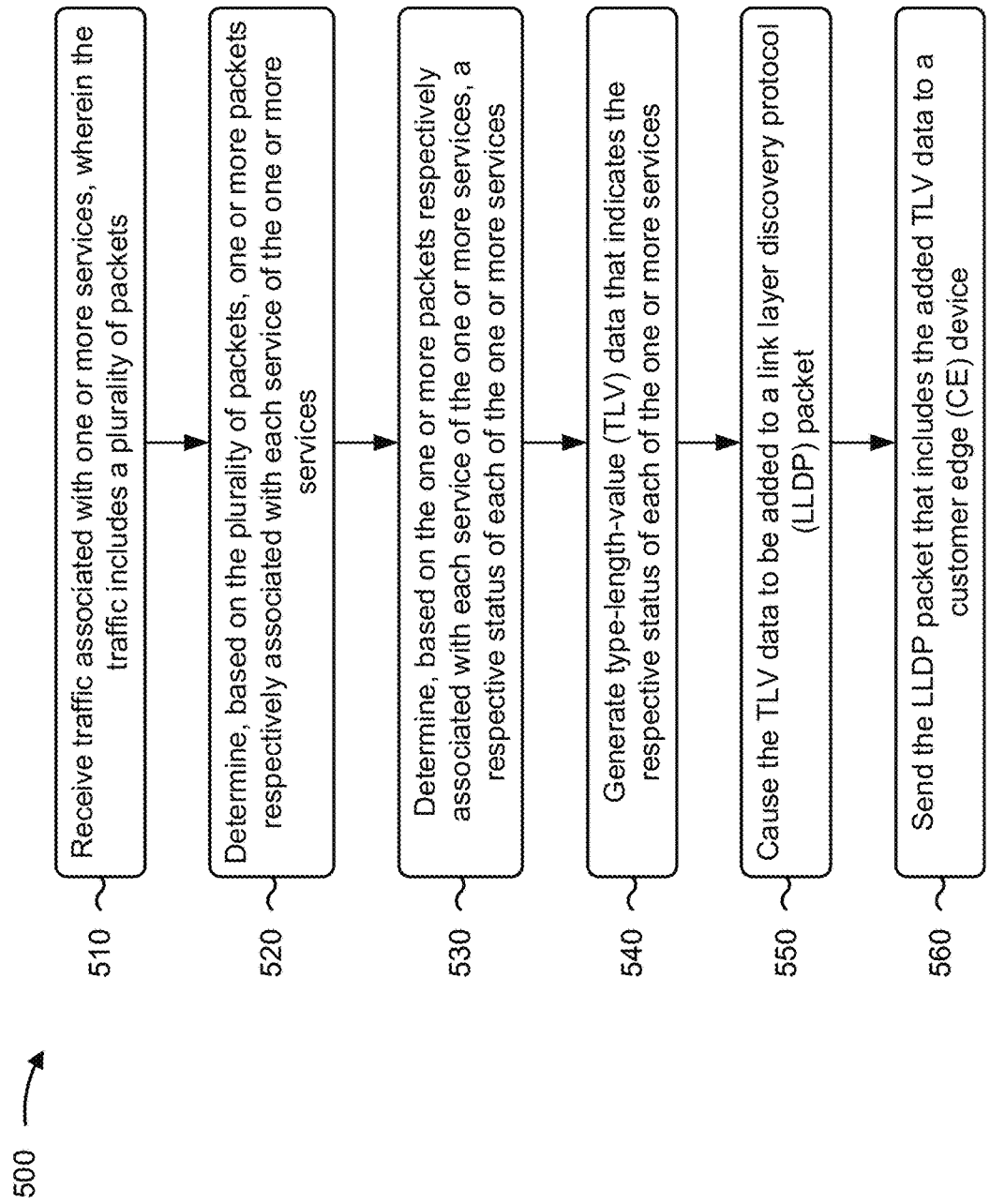

SERVICE STATUS NOTIFICATION

BACKGROUND

A virtual private network (VPN) enables a group of dispersed customer sites to be connected using a Layer 2 virtual bridge. A VPN may include customer edge (CE) devices connected to provider edge (PE) devices. In some cases, a CE is multi-homed with two or more PEs on the VPN. The VPN may be a virtual private local area network service (VPLS), an Ethernet VPN (EVPN), a virtual private wire service (VPWS), a Layer 2 VPN (L2VPN), a Layer 3 VPN (L3VPN), and/or the like.

SUMMARY

According to some implementations, a PE device may include one or more memories, and one or more processors to: receive traffic associated with one or more services, wherein the traffic includes a plurality of packets; determine, based on the plurality of packets, one or more packets respectively associated with each service of the one or more services; determine, based on the one or more packets respectively associated with each service of the one or more services, a respective status of each of the one or more services; generate type-length-value (TLV) data that indicates the respective status of each of the one or more services; cause the TLV data to be added to a link layer discovery protocol (LLDP) packet; and send the LLDP packet that includes the added TLV data to a CE device.

According to some implementations, a non-transitory computer-readable medium may store one or more instructions. The one or more instructions, when executed by one or more processors of a PE device, may cause the one or more processors to: receive traffic associated with one or more services from an additional PE device; determine a respective status of each of the one or more services; generate status data that indicates the respective status of each of the one or more services; cause the status data to be added to a message that is to be sent by the PE device at a scheduled time to a CE device; and send the message that includes the added status data to the CE device at the scheduled time.

According to some implementations, a method may include receiving, by a CE device, a message that includes status data; determining, by the CE device and based on the status data, a respective status of one or more services; identifying, by the CE device and based on the respective status of the one or more services, a first set of services that have an up status and a second set of services that have a down status; causing, by the CE device, first traffic associated with the first set of services to be communicated between the CE device and an additional CE device via a first path comprising at least two first PE devices; and causing, by the CE device, second traffic associated with the second set of services to be communicated between the CE device and the additional CE device via a second path comprising at least two second PE devices.

BRIEF DESCRIPTION OF THE DRAWINGS

As shown in FIGS. 1A-1C, the example implementation(s) 100 may include at least one PE device, at least one CE device, and/or the like.

FIG. 2A-2B are diagrams depicting example TLV data described herein.

FIGS. 5-7 are flowcharts of example processes for sending a service status notification and/or receiving and processing a service status notification.

DETAILED DESCRIPTION

Figure 1A:
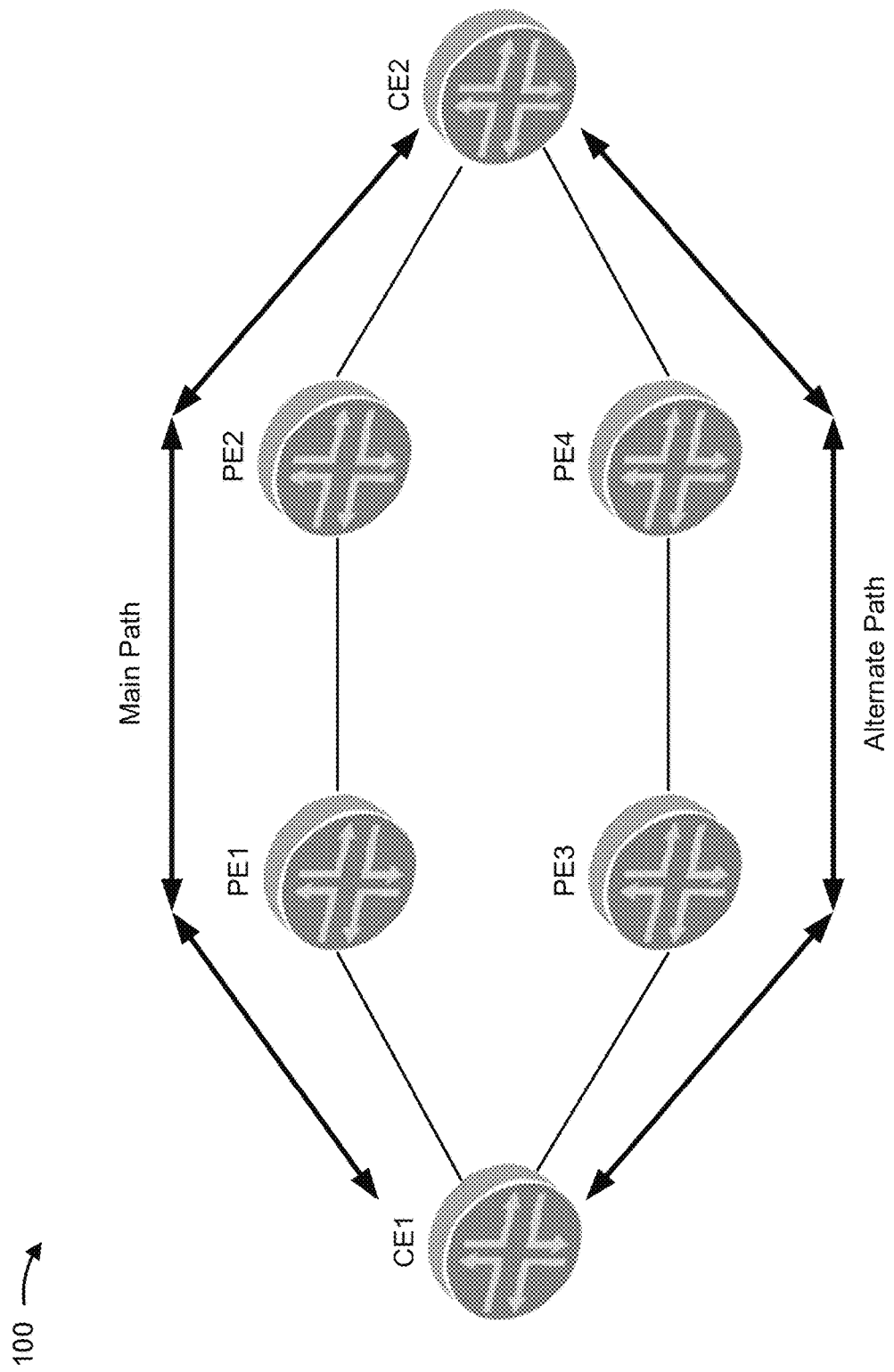
FIGS. 1A-1C are diagrams of one or more example implementations described herein.

The following detailed description of example implementations refers to the accompanying drawings. The same reference numbers in different drawings may identify the same or similar elements.

A VPN provides virtual multipoint bridged connectivity between different Layer 2 domains over an Internet protocol (IP) or IP/multiprotocol label switching (MPLS) core service network. VPN instances are configured on PE devices (e.g., routers, switches, and/or the like) to maintain logical service separation between customer endpoint devices. The PE devices connect to CE devices (e.g., routers, switches, host devices, and/or the like) to route traffic between customer endpoint devices. A VPN may be a VPLS, an EVPN, a VPWS, an L2VPN, an L3VPN, and/or the like.

In some instances, a plurality of services (e.g., a plurality of virtual private network (VPN) services) may be supported by a plurality of PE devices and CE devices of a VPN. In many cases, a PE device may transmit traffic related to the plurality of services to a CE device over one or more physical links between the PE device and the CE device. In some cases, the PE device determines that a failure has occurred related to a service of the plurality of services and brings down the one or more physical links between the PE device and CE device. This prevents the PE and CE device from being able to communicate traffic related to the other services, of the plurality of services, that were not subject to a failure. This leads to unnecessary disruption and/or traffic loss for the other services. Moreover, in some cases, the CE may attempt to change a routing path so that the CE and an alternate PE may communicate additional traffic related to the plurality of services, but this also is time consuming and may lead to traffic disruption and/or loss for the other services.

Some implementations described herein provide a PE device that prevents shutting down of one or more physical links between the PE device and a CE device. In some implementations, the PE device determines a respective status of each service of one or more services supported by the PE device and/or CE device. In some implementations, the PE device may generate status data that indicates the respective status of each of the one or more services and add the status data to a message that is sent to the CE device. In some implementations, the CE device may determine, based on the status data, the respective status of each of the one or more services and may cause traffic related to services that have not encountered an error to continue being communicated between the CE device and the PE device. Moreover, in some implementations, the CE may cause traffic related to services that have encountered an error to be communicated between the CE device and an alternate PE device.

In this way, some implementations described herein allow traffic related to services that have not encountered an error to be communicated between the CE device and the PE without interruption and/or loss. Moreover, some implementations described herein allow traffic related to services that have encountered an error to be communicated between the CE device and the alternate PE device, which still allows the services to be maintained.

Figure 1B:
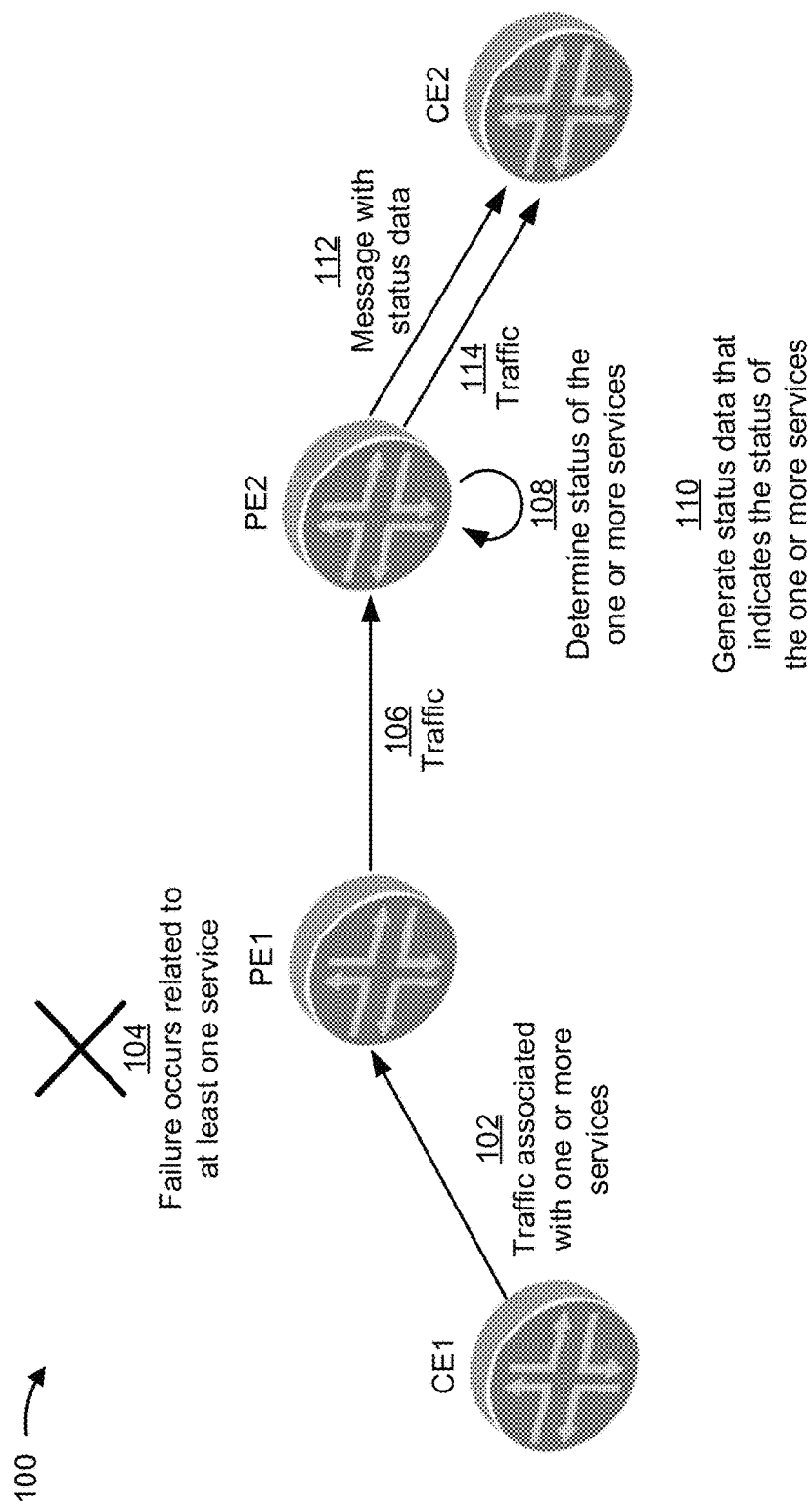
Figure 1C:
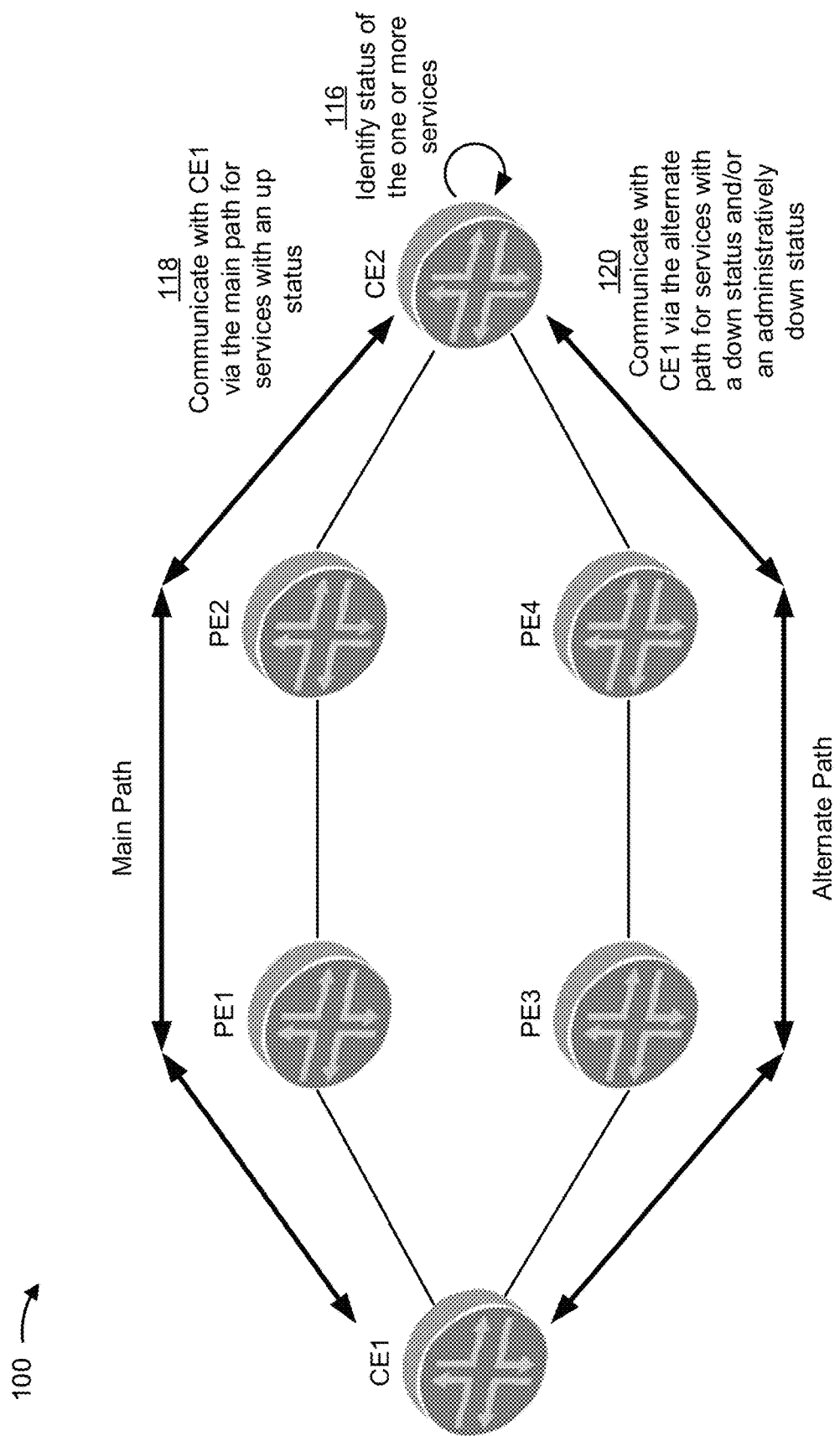

FIGS. 1A-1C are diagrams of one or more example implementations 100 described herein. As shown in FIGS. 1A-1C, example implementation(s) 100 may include multiple network devices, such as a customer edge device 1 (CE1), a customer edge device 2 (CE2), a provider edge device 1 (PE1), a provider edge device 2 (PE2), a provider edge device 3 (PE3), a provider edge device 4 (PE4), and/or the like. One or more of the multiple network devices may be included in a network, such as a VPN (e.g., a VPLS, an EVPN, a VPWS, an L2VPN, an L3VPN, and/or the like). CE1 may be connected to PE1 and PE3 (e.g., via one or more respective links) and CE2 may be connected to PE2 and PE4 (e.g., via one or more respective links). Accordingly, CE1 may be referred to as multi-homed with PE1 and PE3 and CE2 may be referred to as multi-homed with PE2 and PE4. In some implementations, PE1, PE2, PE3, and PE4 are each different PE devices and may be connected to each other via a plurality of links and/or a service core network, such as a Multiprotocol Label Switching (MPLS) network.

As shown in FIG. 1A, a main path and an alternate path may exist for communicating traffic between CE1 and CE2. For example, the main path may include communicating traffic between CE1 and CE2 via PE1 and PE2 (e.g., CE1 sends traffic to PE1, which sends the traffic to PE2, which sends the traffic to CE2, and vice versa) and the alternate path may include communicating traffic between CE1 and CE2 via PE3 and PE4 (e.g., CE1 sends traffic to PE3, which sends the traffic to PE4, which sends the traffic to CE2, and vice versa). CE1 and CE2 may use the main path as a primary path to communicate traffic between CE1 and CE2 and the alternate path as a backup path (e.g., a path to use when traffic cannot be communicated via the main path) to communicate traffic between CE1 and CE2.

As shown in FIG. 1B and by reference number 102, CE1 may send traffic associated with one or more services to PE1 (e.g., via one or more links that connect CE1 and PE1). The one or more services may include an application identification (AppID) service, an intrusion detection and prevention (IDP) service, a uniform resource locator (URL) filtering service, a network address translation (NAT) service, an authentication service, a virtual private network (VPN) service, an application layer gateway (ALG) service, an intrusion prevention system (IPS) service, and/or the like.

The traffic may include a plurality of packets. One or more packets, of the plurality of packets, may be respectively associated with each service of the one or more services. For example, the traffic may include one or more packets associated with a first service, one or more packets associated with a second service, one or more packets associated with a third service, one or more packets associated with a fourth service, and/or the like. In some implementations, the traffic may include one or more packets respectively associated with each service of up to 4,000 different services.

As shown by reference number 104, a failure may occur related to at least one service of the one or more services. For example, an error related to the first service may occur that causes packets related to the first service to cease being generated by CE1 and/or transmitted to PE1. As another example, an error related to the second service may occur that causes at least one packet, of the one or more packets associated with the second service, to indicate that a failure has occurred related to the second service. The at least one packet may be sent to PE1 as part of the traffic sent from CE1 to PE1.

Additionally, or alternatively, at least one service of the one or more services may operate normally (e.g., without a failure occurring). For example, the third service may operate normally such that not one packet, of the one or more packets associated with the third service, indicates that a failure has occurred related to the third service. The one or more packets associated with the third service may be sent to PE1 as part of the traffic sent from CE1 to PE1.

As shown by reference number 106, PE1 may send the traffic received by PE1 to PE2 (e.g., via one or more links that connect PE1 and PE2 and/or via the service core network). PE2 may process the traffic to determine and/or identify the one or more packets respectively associated with each service of the one or more services. For example, PE2 may process the traffic to determine the one or more packets associated with the second service (e.g., the one or more packets that include the at least one packet indicating that a failure has occurred related to the second service), the one or more packets associated with the third service (e.g., the one or more packets that do not indicate that a failure has occurred related to the third service), and/or the like.

As shown by reference number 108, PE2 may determine a respective status of each service of the one or more services. In some implementations, PE2 may determine that a service has an "up" status (e.g., the service is active (e.g., because no service failure has been identified)) or a "down" status (e.g., the service is inactive (e.g., because a service failure has been identified)). For example, PE2 may determine the respective status of each service of the one or more services based on receiving status signaling regarding the one or more services from PE1.

In another example, PE2 may determine that a failure occurred related to the first service because the traffic does not include any packets related to the first service. Accordingly, PE2 may determine that the first service has a down status. As another example, PE2 may determine that at least one packet, of the one or more packets that are included in the traffic and that are associated with the second service, indicates that a failure has occurred related to the second service. PE2 may therefore determine (e.g., by parsing the at least one packet) that the second service has a down status. In another example, PE2 may determine that none of the one or more packets of the traffic that are related to the third service indicate that a failure has occurred related to the third surface. Accordingly, PE2 may determine that the third surface has an up status.

Additionally, or alternatively, PE2 may determine that a service has an "administratively down" status when PE2 is not able to support the service, regardless of whether PE2 has determined that the service has an up status or a down status. For example, PE2 may need to perform one or more administrative operations related to the fourth service (e.g., perform service or maintenance operations related to a data structure associated with the fourth service) and may determine that PE2 is not able to support transmitting and/or receiving packets related to the fourth service (e.g., while PE2 performs the one or more administrative operations). Accordingly, PE2 may determine that the fourth service has an administratively down status.

As shown by reference number 110, PE2 may generate, based on determining the respective status of each service of the one or more services, status data, such as type-length-value (TLV) data, that indicates the respective status of each service of the one or more services. In some implementations, the status data may indicate whether a service, of the one or more services, has an up status, a down status, an administratively down status, and/or the like. For example, PE2 may generate TLV data that indicates that the first service has a down status, that the second service has a down status, that the third service has an up status, that the fourth service has an administratively down status, and/or the like. Further details regarding example TLV data are described herein in relation to FIGS. 2A and 2B.

In some implementations, PE2 may cause the status data to be added to a message. For example, PE2 may cause the TLV data to be added to a link layer discovery protocol (LLDP) packet (e.g., that advertises an identity of PE2, one or more capabilities of PE2, and/or the like). As shown by reference number 112, PE2 may send the message that includes the added status data to CE2 (e.g., via one or more links that connect PE2 and CE). In some implementations, the message may be sent by PE2 to CE2 on a scheduled basis (e.g., every second, every 5 seconds, every 20 seconds, and/or the like). For example, PE2 may send the LLDP packet that includes the added TLV data to CE2 every second. As shown by reference number 114, PE2 may also send the traffic received by PE2 to CE2 (e.g., via the one or more links that connect PE2 and CE).

As shown in FIG. 1C and by reference number 116, CE2 may process the status data added to the message to determine and/or identify the respective status of each service of the one or more services. For example, CE2 may process (e.g., parse) the TLV data included in the LLDP packet to determine that the first service has a down status, the second service has a down status, the third service has an up status, the fourth service has an administratively down status, and/or the like.

In some implementations, CE2 may determine and/or identify a first set of services that have an up status. For example, CE2 may identify the third service as part of the first set of services. Additionally, or alternatively, CE2 may determine and/or identify a second set of services that have a down status and/or an administratively down status. For example, CE2 may identify the first service, the second service, and/or the third service as part of the second set of services.

In some implementations, for each service included in the first set of services (e.g., each service with an up status), CE2 may determine that additional traffic (e.g., one or more additional packets) related to the service is to be communicated via the main path. Accordingly, as shown by reference number 118, CE2 may cause the additional traffic to be communicated between CE1 and CE2 via PE1 and PE2 as described herein. For example, CE2 may send one or more additional packets related to the third service to PE2, which may send the one or more additional packets to PE1, which may send the one or more additional packets to CE1.

Additionally, or alternatively, for each service included in the second set of services (e.g., each service with a down status and/or an administratively down status), CE2 may determine that additional traffic (e.g., one or more additional packets) related to the service is to be communicated via the alternate path. Accordingly, as shown by reference number 120, CE2 may cause the additional traffic to be communicated between CE1 and CE2 via PE3 and PE4 as described herein. For example, CE2 may send one or more additional packets related to the first service, the second service, and/or the fourth service to PE4, which may send the one or more additional packets to PE3, which may send the one or more additional packets to CE1.

As indicated above, FIGS. 1A-1C are provided merely as one or more examples. Other examples may differ from what is described with regard to FIGS. 1A-1C.

FIGS. 2A and 2B depict example TLV data 200 and 210 described herein. As shown in FIG. 2A, example TLV data 200 may define a new TLV type (e.g., "NEW_SERVICE-S-TATUS-TYP") that uses an unused TLV type (e.g., unused 0xA). In this way, example TLV data 200 may be read by any PE device or CE device that can read standard TLV data. Example TLV data 200 may include a Service-Status-Information field that indicates service status information for one or more services. For example, the Service-Status-Information field that may identify a respective service identifier of one or more services (e.g., shown in FIG. 2A as Service-ID-x through Service-ID-N) and a respective status of the one or more services (e.g., where 1 indicates "UP" (e.g., an up status), 2 indicates "ADMIN_DOWN" (e.g., an administratively down status), and 3 indicates "DOWN" (e.g., a down status).

Similarly, as shown in FIG. 2B, example TLV data 210 may define a new TLV type (e.g., "CUSTOM-TLV-TYPE") that is specific to an operator (e.g., an operator of a network). In this way, example TLV data 210 may be read by any PE device or CE device that is associated with the operator, but not by any other PE device or CE device that is not associated with the operator. Example TLV data 210 may include a Service-Status-Information field that indicates service status information for one or more services. For example, the Service-Status-Information field may identify a respective service identifier of one or more services (e.g., shown in FIG. 2A as Service-ID-x through Service-ID-N) and a respective status of the one or more services (e.g., where 1 indicates "UP" (e.g., an up status), 2 indicates "ADMIN_DOWN" (e.g., an administratively down status), and 3 indicates "DOWN" (e.g., a down status).

As indicated above, FIGS. 2A-2B are provided merely as one or more examples. Other examples may differ from what is described with regard to FIGS. 2A-2B.

Figure 3:
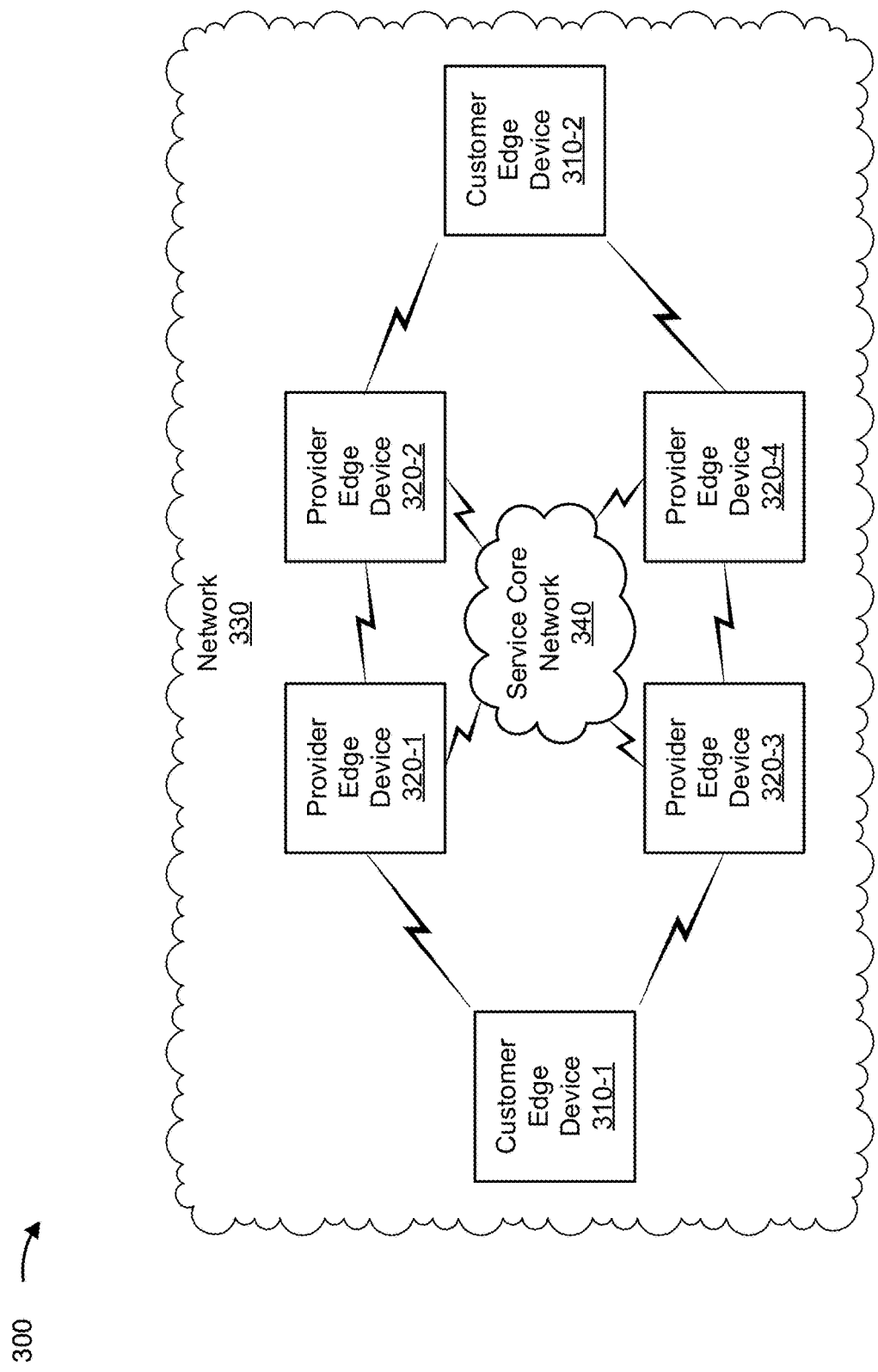
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include customer edge device 310-1 and customer edge device 310-2 (hereinafter referred to collectively as "customer edge devices 310," and individually as "customer edge device 310"); provider edge device 320-1, provider edge device 320-2, provider edge device 320-3, and provider edge device 320-4 (hereinafter referred to collectively as "provider edge devices 320," and individually as "provider edge device 320"); and a network 330. Devices of environment 300 may interconnect via wired connections, wireless connections, or a combination of wired and wireless connections.

Customer edge device 310 includes one or more devices (e.g., one or more traffic transfer devices) capable of processing and/or transferring traffic. For example, customer edge device 310 may include a firewall, a router, a gateway, a switch, a hub, a bridge, a reverse proxy, a server (e.g., a proxy server), a security device, an intrusion detection device, a load balancer, or a similar type of device. In some implementations, customer edge device may be connected to provider edge device 320 via a link, a plurality of links, and/or the like, as described elsewhere herein. In some implementations, customer edge device 310 may transmit traffic to provider edge device 320 and receive traffic from provider edge device 320, as described elsewhere herein. In some implementations, customer edge device 310 may be a physical device implemented within a housing, such as a chassis. In some implementations, customer edge device 310 may be a virtual device implemented by one or more computer devices of a cloud computing environment or a data center.

Provider edge device 320 includes one or more devices (e.g., one or more traffic transfer devices) capable of processing and/or transferring traffic. For example, provider edge device 320 may include a firewall, a router, a gateway, a switch, a hub, a bridge, a reverse proxy, a server (e.g., a proxy server), a security device, an intrusion detection device, a load balancer, or a similar type of device. In some implementations, provider edge device 320 may receive traffic from customer edge device 310 and may transmit the traffic to another customer edge device 310 and/or another provider edge device 320, as described elsewhere herein. In some implementations, provider edge device 320 may be a physical device implemented within a housing, such as a chassis. In some implementations, provider edge device 320 may be a virtual device implemented by one or more computer devices of a cloud computing environment or a data center.

Network 330 includes one or more wired and/or wireless networks. For example, network 330 may include a cellular network (e.g., a long-term evolution (LTE) network, a 3G network, a 4G network, a 5G network, a New Radio (NR) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), an Ethernet network, a VPN (E.g., a VPLS, an EVPN, a VPWS, an L2VPN, an L3VPN, and/or the like), a private network, an ad hoc network, an intranet, the Internet, a fiber optic-based network, a cloud computing network, or the like, and/or a combination of these or other types of networks.

Service core network 340 includes a network associated with routing and/or forwarding traffic provided via network 330. For example, service core network 340 may be a label switching (e.g., a multi-protocol label switching (MPLS)) based service core network, an internet protocol (IP) based service core network, and/or another type of service core network through which traffic associated with network 330 may travel.

The number and arrangement of devices and networks shown in FIG. 3 are provided as one or more examples. In practice, there may be additional devices, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4A:
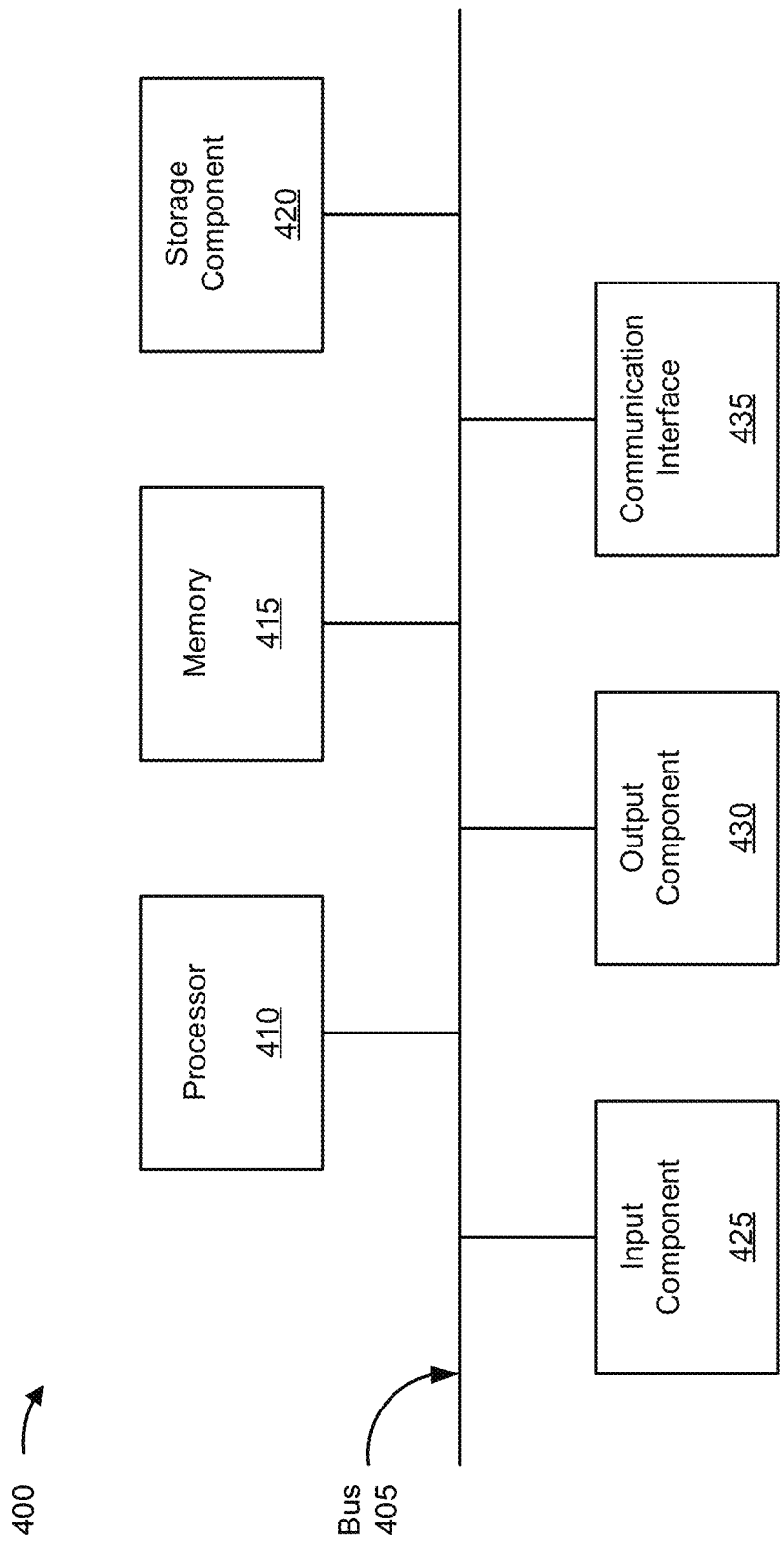
FIGS. 4A-4B are diagrams of example components of one or more devices of FIG. 3.
Figure 4B:
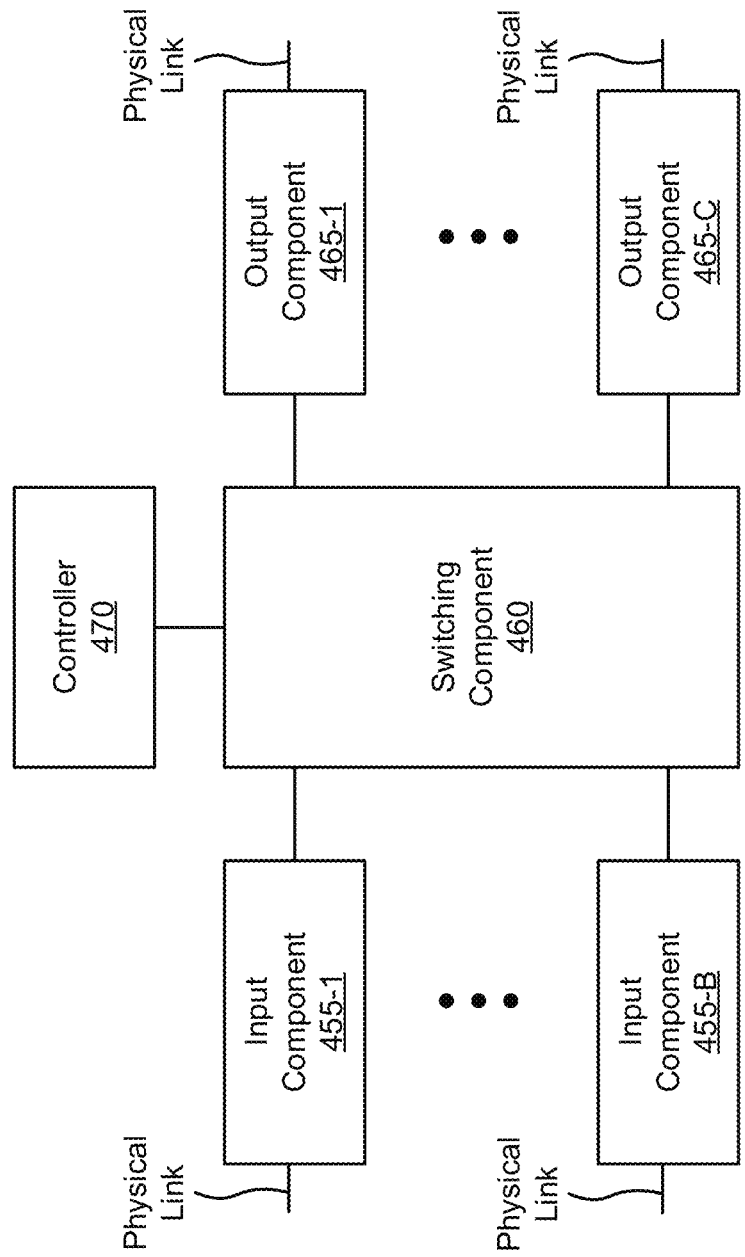

FIGS. 4A-4B are diagrams of example components of one or more devices of FIG. 3. FIG. 4A is a diagram of example components of a device 400. Device 400 may correspond to customer edge device 310, provider edge device 320, and/or the like. In some implementations, customer edge device 310, provider edge device 320, and/or the like may include one or more devices 400 and/or one or more components of device 400. As shown in FIG. 4A, device 400 may include a bus 405, a processor 410, a memory 415, a storage component 420, an input component 425, an output component 430, and a communication interface 435.

Bus 405 includes a component that permits communication among the components of device 400. Processor 410 is implemented in hardware, firmware, or a combination of hardware and software. Processor 410 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 410 includes one or more processors capable of being programmed to perform a function. Memory 415 includes a random access memory (RAM), a read only memory (ROM), and/or another type of dynamic or static storage device (e.g., a flash memory, a magnetic memory, and/or an optical memory) that stores information and/or instructions for use by processor 410.

Storage component 420 stores information and/or software related to the operation and use of device 400. For example, storage component 420 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 425 includes a component that permits device 400 to receive information, such as via user input (e.g., a touch screen display, a keyboard, a keypad, a mouse, a button, a switch, and/or a microphone). Additionally, or alternatively, input component 425 may include a sensor for sensing information (e.g., a global positioning system (GPS) component, an accelerometer, a gyroscope, and/or an actuator). Output component 430 includes a component that provides output information from device 400 (e.g., a display, a speaker, and/or one or more light-emitting diodes (LEDs)).

Communication interface 435 includes a transceiver-like component (e.g., a transceiver and/or a separate receiver and transmitter) that enables device 400 to communicate with other devices, such as via a wired connection, a wireless connection, or a combination of wired and wireless connections. Communication interface 435 may permit device 400 to receive information from another device and/or provide information to another device. For example, communication interface 435 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 410 executing software instructions stored by a non-transitory computer-readable medium, such as memory 415 and/or storage component 420. A computer-readable medium is defined herein as a non-transitory memory device. A memory device includes memory space within a single physical storage device or memory space spread across multiple physical storage devices.

Software instructions may be read into memory 415 and/or storage component 420 from another computer-readable medium or from another device via communication interface 435. When executed, software instructions stored in memory 415 and/or storage component 420 may cause processor 410 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4A are provided as an example. In practice, device 400 may include additional components, fewer components, different components, or differently arranged components than those shown in FIG. 4A. Additionally, or alternatively, a set of components (e.g., one or more components) of device 400 may perform one or more functions described as being performed by another set of components of device 400.

FIG. 4B is a diagram of example components of a device 450. Device 450 may correspond to customer edge device 310, provider edge device 320, and/or the like. In some implementations, customer edge device 310, provider edge device 320, and/or the like may include one or more devices 450 and/or one or more components of device 450. As shown in FIG. 4B, device 450 may include one or more input components 455-1 through 455-B (B≥1) (hereinafter referred to collectively as input components 455, and individually as input component 455), a switching component 460, one or more output components 465-1 through 465-C (C≥1) (hereinafter referred to collectively as output components 465, and individually as output component 465), and a controller 470.

Input components 455 may be points of attachment for physical links and may be points of entry for incoming traffic, such as packets. Input component 455 may process incoming traffic, such as by performing data link layer encapsulation or decapsulation. In some implementations, input component 455 may send and/or receive packets. In some implementations, input component 455 may include an input line card that includes one or more packet processing components (e.g., in the form of integrated circuits), such as one or more interface cards (IFCs), packet forwarding components, line card controller components, input ports, processors, memories, and/or input queues. In some implementations, device 450 may include one or more input components 455.

Switching component 460 may interconnect input components 455 with output components 465. In some implementations, switching component 460 may be implemented via one or more crossbars, via busses, and/or with shared memories. The shared memories may act as temporary buffers to store packets from input components 455 before the packets are eventually scheduled for delivery to output components 465. In some implementations, switching component 460 may enable input components 455, output components 465, and/or controller 470 to communicate.

Output component 465 may store packets and may schedule packets for transmission on output physical links. Output component 465 may support data link layer encapsulation or decapsulation, and/or a variety of higher-level protocols. In some implementations, output component 465 may send packets and/or receive packets. In some implementations, output component 465 may include an output line card that includes one or more packet processing components (e.g., in the form of integrated circuits), such as one or more IFCs, packet forwarding components, line card controller components, output ports, processors, memories, and/or output queues. In some implementations, device 450 may include one or more output components 465. In some implementations, input component 455 and output component 465 may be implemented by the same set of components (e.g., and input/output component may be a combination of input component 455 and output component 465).

Controller 470 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 470 may include one or more processors that can be programmed to perform a function.

In some implementations, controller 470 may include a RAM, a ROM, and/or another type of dynamic or static storage device (e.g., a flash memory, a magnetic memory, an optical memory, etc.) that stores information and/or instructions for use by controller 470.

In some implementations, controller 470 may communicate with other devices, networks, and/or systems connected to device 400 to exchange information regarding network topology. Controller 470 may create routing tables based on the network topology information, create forwarding tables based on the routing tables, and forward the forwarding tables to input components 455 and/or output components 465. Input components 455 and/or output components 465 may use the forwarding tables to perform route lookups for incoming and/or outgoing packets.

Controller 470 may perform one or more processes described herein. Controller 470 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 470 from another computer-readable medium or from another device via a communication interface. When executed, software instructions stored in a memory and/or storage component associated with controller 470 may cause controller 470 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4B are provided as an example. In practice, device 450 may include additional components, fewer components, different components, or differently arranged components than those shown in FIG. 4B. Additionally, or alternatively, a set of components (e.g., one or more components) of device 450 may perform one or more functions described as being performed by another set of components of device 450.

FIG. 5 is a flowchart of an example process 500 for sending a service status notification. In some implementations, one or more process blocks of FIG. 5 may be performed by a provider edge (PE) device (e.g., provider edge device 320). In some implementations, one or more process blocks of FIG. 5 may be performed by another device or a group of devices separate from or including the PE device, such as another PE device, a customer edge (CE) device (e.g., customer edge device 310), and/or the like.

As shown in FIG. 5, process 500 may include receiving traffic associated with one or more services, wherein the traffic includes a plurality of packets (block 510). For example, the PE device (e.g., using processor 410, memory 415, storage component 420, input component 425, output component 430, communication interface 435, input component 455, switching component 460, output component 465, controller 470, and/or the like) may receive traffic associated with one or more services, as described above. In some implementations, the traffic includes a plurality of packets.

As further shown in FIG. 5, process 500 may include determining, based on the plurality of packets, one or more packets respectively associated with each service of the one or more services (block 520). For example, the PE device (e.g., using processor 410, memory 415, storage component 420, input component 425, output component 430, communication interface 435, input component 455, switching component 460, output component 465, controller 470, and/or the like) may determine, based on the plurality of packets, one or more packets respectively associated with each service of the one or more services, as described above.

As further shown in FIG. 5, process 500 may include determining, based on the one or more packets respectively associated with each service of the one or more services, a respective status of each of the one or more services (block 530). For example, the PE device (e.g., using processor 410, memory 415, storage component 420, input component 425, output component 430, communication interface 435, input component 455, switching component 460, output component 465, controller 470, and/or the like) may determine, based on the one or more packets respectively associated with each service of the one or more services, a respective status of each of the one or more services, as described above.

As further shown in FIG. 5, process 500 may include generating type-length-value (TLV) data that indicates the respective status of each of the one or more services (block 540). For example, the PE device (e.g., using processor 410, memory 415, storage component 420, input component 425, output component 430, communication interface 435, input component 455, switching component 460, output component 465, controller 470, and/or the like) may generate TLV data that indicates the respective status of each of the one or more services, as described above.

As further shown in FIG. 5, process 500 may include causing the TLV data to be added to a link layer discovery protocol (LLDP) packet (block 550). For example, the PE device (e.g., using processor 410, memory 415, storage component 420, input component 425, output component 430, communication interface 435, input component 455, switching component 460, output component 465, controller 470, and/or the like) may cause the TLV data to be added to an LLDP packet, as described above.

As further shown in FIG. 5, process 500 may include sending the LLDP packet that includes the added TLV data to a CE device (block 560). For example, the PE device (e.g., using processor 410, memory 415, storage component 420, input component 425, output component 430, communication interface 435, input component 455, switching component 460, output component 465, controller 470, and/or the like) may send the LLDP packet that includes the added TLV data to a CE device, as described above.

Process 500 may include additional implementations, such as any single implementation or any combination of implementations described below and/or in connection with one or more other processes described elsewhere herein.

In a first implementation, the one or more services include at least one of an application identification (AppID) service; an intrusion detection and prevention (IDP) service; a uniform resource locator (URL) filtering service; a network address translation (NAT) service; an authentication service; a virtual private network (VPN) service; an application layer gateway (ALG) service; or an intrusion prevention system (IPS) service.

In a second implementation, alone or in combination with the first implementation, the PE device and the CE device are included in an Ethernet virtual private network.

In a third implementation, alone or in combination with one or more of the first and second implementations, the TLV data indicates whether a service, of the one or more services, has an up status or a down status.

In a fourth implementation, alone or in combination with one or more of the first through third implementations, the PE device may receive the traffic from another PE device via a service core network.

In a fifth implementation, alone or in combination with one or more of the first through fourth implementations, when determining the respective status of each of the one or more services, the PE device determines that at least one packet, of the one or more packets, indicates that a failure has occurred related to a service and determines, based on determining that the at least one packet indicates that a failure has occurred related to the service, that the status of the service is a down status.

In a sixth implementation, alone or in combination with one or more of the first through fifth implementations, when determining the respective status of each of the one or more services, the PE device determines that the one or more packets do not indicate that a failure has occurred related to a service and determines, based on determining that the one or more packets do not indicate that a failure has occurred related to the service, that the status of the service is an up status.

In a seventh implementation, alone or in combination with one or more of the first through sixth implementations, the TLV data indicates that a service, of the one or more services, has a down status, and sending the LLDP packet that includes the added TLV data to the CE device causes the CE device to send one or more additional packets related to the service to an alternate PE device.

In an eighth implementation, alone or in combination with one or more of the first through seventh implementations, the TLV data indicates that a service, of the one or more services, has an up status; the PE device receives, after sending the LLDP packet that includes the added TLV data to the CE device, one or more additional packets related to the service from the CE device; and the PE device sends the one or more additional packets to an additional CE device via an additional PE device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
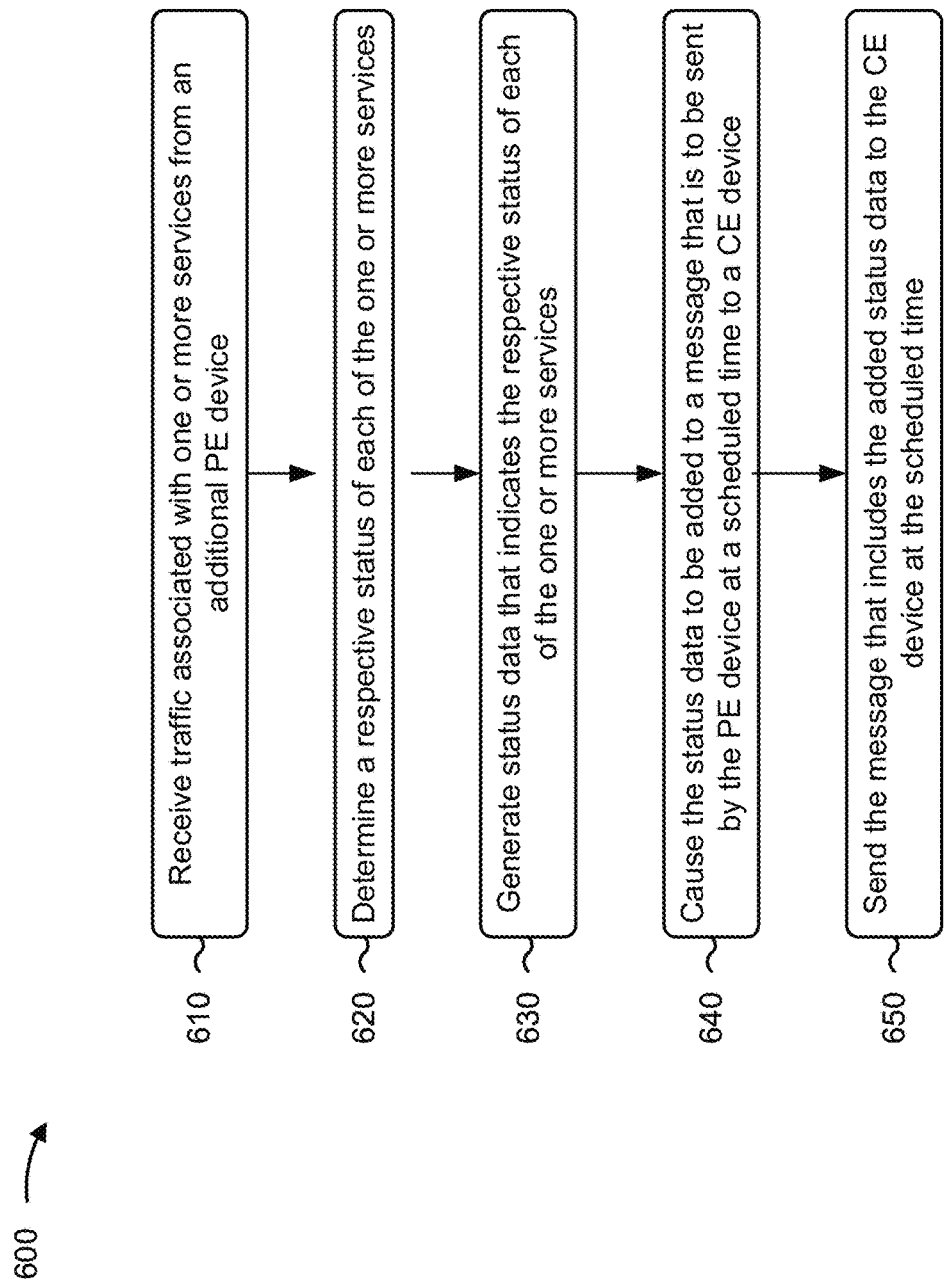

FIG. 6 is a flowchart of an example process 600 for sending a service status notification. In some implementations, one or more process blocks of FIG. 6 may be performed by a provider edge (PE) device (e.g., provider edge device 320). In some implementations, one or more process blocks of FIG. 6 may be performed by another device or a group of devices separate from or including the PE device, such as another PE device, a customer edge (CE) device (e.g., customer edge device 310), and/or the like.

As shown in FIG. 6, process 600 may include receiving traffic associated with one or more services from an additional PE device (block 610). For example, the PE device (e.g., using processor 410, memory 415, storage component 420, input component 425, output component 430, communication interface 435, input component 455, switching component 460, output component 465, controller 470, and/or the like) may receive traffic associated with one or more services from an additional PE device, as described above.

As further shown in FIG. 6, process 600 may include determining a respective status of each of the one or more services (block 620). For example, the PE device (e.g., using processor 410, memory 415, storage component 420, input component 425, output component 430, communication interface 435, input component 455, switching component 460, output component 465, controller 470, and/or the like) may determine a respective status of each of the one or more services, as described above.

As further shown in FIG. 6, process 600 may include generating status data that indicates the respective status of each of the one or more services (block 630). For example, the PE device (e.g., using processor 410, memory 415, storage component 420, input component 425, output component 430, communication interface 435, input component 455, switching component 460, output component 465, controller 470, and/or the like) may generate status data that indicates the respective status of each of the one or more services, as described above.

As further shown in FIG. 6, process 600 may include causing the status data to be added to a message that is to be sent by the PE device at a scheduled time to a CE device (block 640). For example, the PE device (e.g., using processor 410, memory 415, storage component 420, input component 425, output component 430, communication interface 435, input component 455, switching component 460, output component 465, controller 470, and/or the like) may cause the status data to be added to a message that is to be sent by the PE device at a scheduled time to a CE device, as described above.

As further shown in FIG. 6, process 600 may include sending the message that includes the added status data to the CE device at the scheduled time (block 650). For example, the PE device (e.g., using processor 410, memory 415, storage component 420, input component 425, output component 430, communication interface 435, input component 455, switching component 460, output component 465, controller 470, and/or the like) may send the message that includes the added status data to the CE device at the scheduled time, as described above.

Process 600 may include additional implementations, such as any single implementation or any combination of implementations described below and/or in connection with one or more other processes described elsewhere herein.

In a first implementation, the status data is type-length-value data and the message is a link layer discovery protocol packet.

In a second implementation, alone or in combination with the first implementation, the status data indicates whether a service, of the one or more services, has an up status, a down status, or an administratively down status.

In a third implementation, alone or in combination with one or more of the first and second implementations, when determining the respective status of each of the one or more services, the PE device may determine that a service, of the one or more services, has an up status; determine that a service, of the one or more services, has a down status; or determine that a service, of the one or more services, has an administratively down status.

In a fourth implementation, alone or in combination with one or more of the first through third implementations, the status data indicates that a set of services, of the one or more services, has an up status, and the PE device may receive, from the CE device, additional traffic associated with at least one service of the set of services and send the additional traffic to the additional PE device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
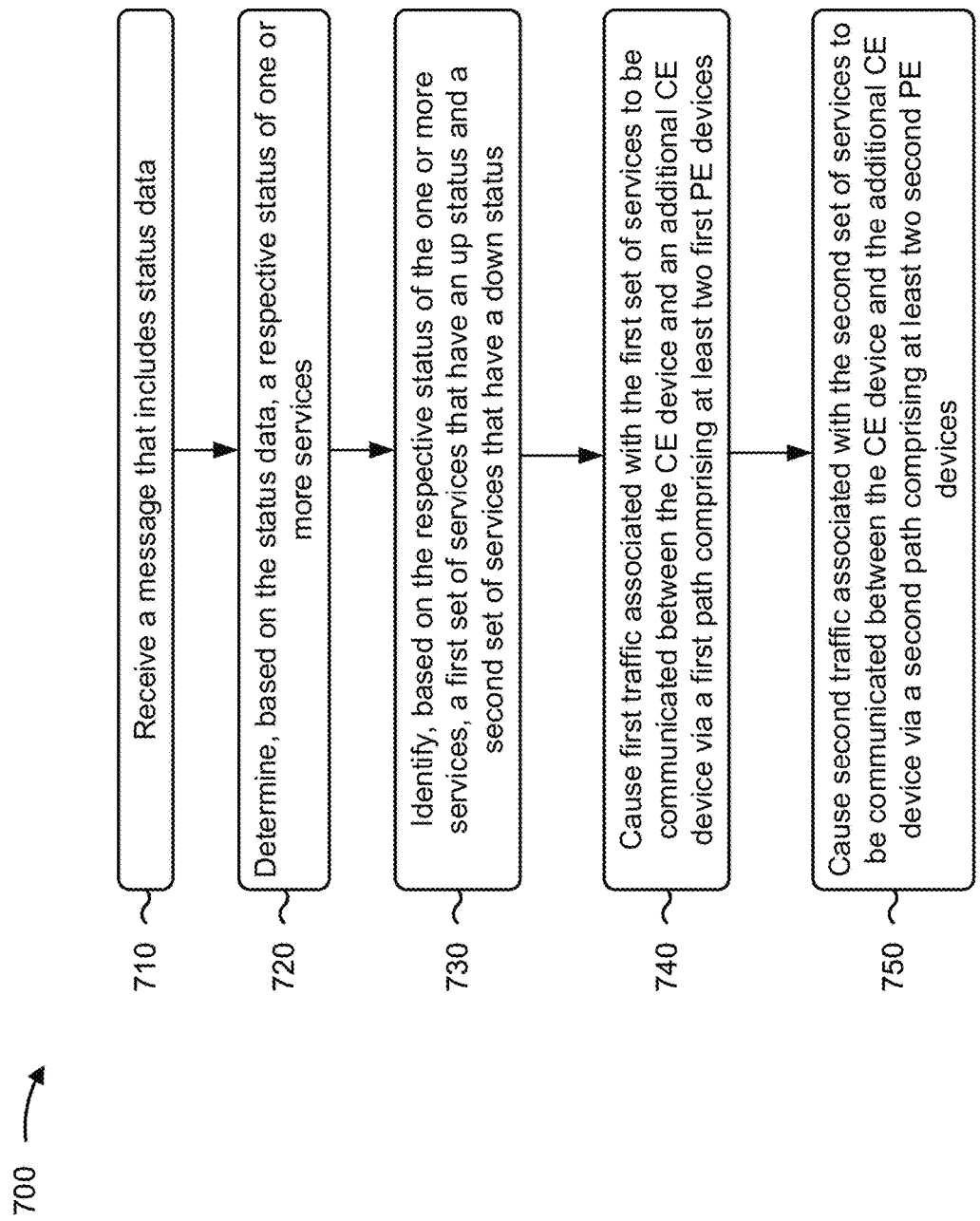

FIG. 7 is a flowchart of an example process 700 for receiving and processing a service status notification. In some implementations, one or more process blocks of FIG. 7 may be performed by a CE device (e.g., customer edge device 310). In some implementations, one or more process blocks of FIG. 7 may be performed by another device or a group of devices separate from or including the CE device, such as another CE device, a PE device (e.g., provider edge device 320), and/or the like.

As shown in FIG. 7, process 700 may include receiving a message that includes status data (block 710). For example, the CE device (e.g., using processor 410, memory 415, storage component 420, input component 425, output component 430, communication interface 435, input component 455, switching component 460, output component 465, controller 470, and/or the like) may receive a message that includes status data, as described above.

As further shown in FIG. 7, process 700 may include determining, based on the status data, a respective status of one or more services (block 720). For example, the CE device (e.g., using processor 410, memory 415, storage component 420, input component 425, output component 430, communication interface 435, input component 455, switching component 460, output component 465, controller 470, and/or the like) may determine, based on the status data, a respective status of one or more services, as described above.

As further shown in FIG. 7, process 700 may include identifying, based on the respective status of the one or more services, a first set of services that have an up status and a second set of services that have a down status (block 730). For example, the CE device (e.g., using processor 410, memory 415, storage component 420, input component 425, output component 430, communication interface 435, input component 455, switching component 460, output component 465, controller 470, and/or the like) may identify, based on the respective status of the one or more services, a first set of services that have an up status and a second set of services that have a down status, as described above.

As further shown in FIG. 7, process 700 may include causing first traffic associated with the first set of services to be communicated between the CE device and an additional CE device via a first path comprising at least two first PE devices (block 740). For example, the CE device (e.g., using processor 410, memory 415, storage component 420, input component 425, output component 430, communication interface 435, input component 455, switching component 460, output component 465, controller 470, and/or the like) may cause first traffic associated with the first set of services to be communicated between the CE device and an additional CE device via a first path comprising at least two first PE devices, as described above.

As further shown in FIG. 7, process 700 may include causing second traffic associated with the second set of services to be communicated between the CE device and the additional CE device via a second path comprising at least two second PE devices (block 750). For example, the CE device (e.g., using processor 410, memory 415, storage component 420, input component 425, output component 430, communication interface 435, input component 455, switching component 460, output component 465, controller 470, and/or the like) may cause second traffic associated with the second set of services to be communicated between the CE device and the additional CE device via a second path comprising at least two second PE devices, as described above.

Process 700 may include additional implementations, such as any single implementation or any combination of implementations described below and/or in connection with one or more other processes described elsewhere herein.

In a first implementation, any PE device included in the at least two first PE devices is not included in the at least two second PE devices.

In a second implementation, alone or in combination with the first implementation, the message is a link layer discovery protocol packet and the status data is type-length-value data.

In a third implementation, alone or in combination with one or more of the first and second implementations, the status data indicates whether each service of the one or more services has an up status or a down status.

In a fourth implementation, alone or in combination with one or more of the first through third implementations, the CE device, the additional CE device, the first path, and the second path are included in an Ethernet virtual private network.

In a fifth implementation, alone or in combination with one or more of the first through fourth implementations, the CE device receives the message from a first particular PE device, of the at least two first PE devices, via one or more links that connect the CE device and the first particular PE device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, the terms traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A provider edge (PE) device, comprising:
one or more memories; and
one or more processors to:
  receive, by a first customer edge (CE) device and via a path to a second CE device, traffic associated with one or more services supported by the PE device, wherein the traffic includes a plurality of packets;
  determine, based on the plurality of packets, one or more packets respectively associated with each service of the one or more services;
  determine, based on the one or more packets respectively associated with each service of the one or more services, a respective status of each of the one or more services,
    wherein a respective status of a first service, of the one or more services, supported by the PE device is an up status when one or more packets associated with the first service do not indicate that a failure has occurred related to the first service, and
    wherein a respective status of a second service, of the one or more services, supported by the PE device is a down status or an administratively down status when one or more packets associated with the second service indicate that a failure has occurred related to the second service;
  generate type-length-value (TLV) data that indicates the respective status of each of the one or more services,
    wherein the TLV data indicates the up status for the first service and the down status or the administratively down status for the second service;
  cause the TLV data to be added to a link layer discovery protocol (LLDP) packet; and
  send the LLDP packet that includes the added TLV data via the path to the second CE device.

2. The PE device of claim 1, wherein the one or more services include at least one of:
an application identification (AppID) service;
an intrusion detection and prevention (IDP) service;
a uniform resource locator (URL) filtering service;
a network address translation (NAT) service;
an authentication service;
a virtual private network (VPN) service;
an application layer gateway (ALG) service; or
an intrusion prevention system (IPS) service.

3. The PE device of claim 1, wherein the PE device and the second CE device are included in a virtual private local area network (LAN) service (VPLS), an Ethernet virtual private network (VPN), a virtual private wire service (VPWS), a Layer 2 VPN (L2VPN), or a Layer 3 VPN (L3VPN).

4. The PE device of claim 1, wherein the PE device may receive the traffic from another PE device via a service core network.

5. The PE device of claim 1, wherein the one or more processors, when determining the respective status of each of the one or more services, are further to:
determine that at least one packet, of the one or more packets, indicates that a failure has occurred related to the second service; and
determine, based on determining that the at least one packet indicates that a failure has occurred related to the second service, that a respective status of the second service is the down status.

6. The PE device of claim 1, wherein the one or more processors, when determining the respective status of each of the one or more services, are further to:
determine that the one or more packets do not indicate that a failure has occurred related to the first service supported by the PE device; and
determine, based on determining that the one or more packets do not indicate that a failure has occurred related to the first service, that the respective status of the first service supported by the PE device is the up status.

7. The PE device of claim 1,
wherein sending the LLDP packet that includes the added TLV data to the second CE device causes the second CE device to send one or more additional packets related to the second service to an alternate PE device.

8. The PE device of claim 1,
wherein the one or more processors are further to:
receive, after sending the LLDP packet that includes the added TLV data to the second CE device, one or more additional packets related to the first service from the second CE device; and
send the one or more additional packets to an additional CE device via an additional PE device.

9. A non-transitory computer-readable medium storing instructions, the instructions comprising:
one or more instructions that, when executed by one or more processors of a provider edge (PE) device, cause the one or more processors to:
receive, from a first customer edge (CE) device and via a path to a second CE device, traffic associated with one or more services, supported by the PE device, from an additional PE device;
determine a respective status of each of the one or more services,
wherein a respective status of a first service, of the one or more services, supported by the PE device is an up status when one or more packets associated with the first service do not indicate that a failure has occurred related to the first service, and
wherein a respective status of a second service, of the one or more services, supported by the PE device is a down status or an administratively down status when one or more packets associated with the second service indicate that a failure has occurred related to the second service;
generate status data that indicates the respective status of each of the one or more services,
wherein the status data indicates the up status for the first service and the down status or the administratively down status for the second service;
cause the status data to be added to a message that is to be sent by the PE device at a scheduled time to the second CE device; and
send the message that includes the added status data to the second CE device at the scheduled time.

10. The non-transitory computer-readable medium of claim 9, wherein the status data is type-length-value data and the message is a link layer discovery protocol packet.

11. The non-transitory computer-readable medium of claim 9, wherein the status data indicates whether a third service, of the one or more services, has an up status, a down status, or an administratively down status.

12. The non-transitory computer-readable medium of claim 9, wherein the one or more instructions, that cause the one or more processors to determine the respective status of each of the one or more services, cause the one or more processors to:
determine that a third service, of the one or more services, has an up status;
determine that the third service, of the one or more services, has a down status; or
determine that the third service, of the one or more services, has an administratively down status.

13. The non-transitory computer-readable medium of claim 9,
wherein the status data indicates that a set of services, of the one or more services, has an up status, and
wherein the one or more instructions, when executed by the one or more processors, further cause the one or more processors to:
receive, from the second CE device, additional traffic associated with at least one service of the set of services; and
send the additional traffic to the additional PE device.

14. A provider edge (PE) device, comprising:
one or more memories; and
one or more processors to:
receive, from a first customer edge (CE) device and via a path to a second CE device, traffic associated with one or more services supported by the PE device,
determine a respective status of each of the one or more services,
wherein a respective status of a first service, of the one or more services, supported by the PE device is an up status when one or more packets associated with the first service do not indicate that a failure has occurred related to the first service, and
wherein a respective status of a second service, of the one or more services, supported by the PE device is a down status or an administratively down status when one or more packets associated with the second service indicate that a failure has occurred related to the second service;

generate status data that indicates the respective status of each of the one or more services,
  wherein the status data indicates the up status for the first service and the down status or the administratively down status for the second service;
cause the status data to be added to a message; and
send the message that includes the added status data to the second CE device.

15. The device of claim 14, wherein a respective status of a third service, of the one or more services, is an up status when the traffic indicates that no failure has occurred related to the third service.

16. The device of claim 14, wherein a respective status of a third service, of the one or more services, is a down status when the traffic indicates that a failure has occurred related to the third service.

17. The device of claim 14, wherein the one or more processors are further to:

receive, from the second CE device, additional traffic associated with the first service; and
send the additional traffic to an additional PE device.

18. The PE device of claim 14, wherein the one or more processors, when determining the respective status of each of the one or more services, are further to:
determine that at least one failure has occurred related to the second service; and
determine, based on determining that the at least one failure has occurred related to the second service, that a respective status of the second service is a down status.

19. The PE device of claim 14, wherein the status data is type-length-value (TLV) data.

20. The PE device of claim 1 wherein the TLV data indicates whether a third service, of the one or more services, has an up status, a down status, or an administratively down status.

* * * * *